(12) United States Patent
Ramani et al.

(10) Patent No.: US 8,959,476 B2
(45) Date of Patent: Feb. 17, 2015

(54) CENTRALIZED CONTEXT MENUS AND TOOLTIPS

(75) Inventors: Sundaram Ramani, Redmond, WA (US); Brett Kilty, Sammamish, WA (US); Benjamin Carter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1786 days.

(21) Appl. No.: 11/329,706

(22) Filed: Jan. 11, 2006

(65) Prior Publication Data

US 2007/0162898 A1 Jul. 12, 2007

(51) Int. Cl.
*G06F 9/44* (2006.01)

(52) U.S. Cl.
CPC .............. *G06F 9/4443* (2013.01); *G06F 8/38* (2013.01)
USPC ............ 717/105; 717/100; 717/104; 717/113

(58) Field of Classification Search
CPC .............. G06F 8/10; G06F 8/20; G06F 8/34; G06F 8/38
See application file for complete search history.

(56) References Cited

U.S. PATENT DOCUMENTS

| | | | |
|---|---|---|---|
| 5,694,562 A | 12/1997 | Fisher | |
| 5,923,325 A | 7/1999 | Barber et al. | |
| 5,937,417 A * | 8/1999 | Nielsen | 715/711 |
| 6,199,082 B1 * | 3/2001 | Ferrel et al. | 715/205 |
| 6,281,879 B1 | 8/2001 | Graham | |
| 6,363,435 B1 * | 3/2002 | Fernando et al. | 719/318 |
| 6,542,164 B2 | 4/2003 | Graham | |
| 6,819,336 B1 * | 11/2004 | Nielsen | 715/711 |
| 6,826,729 B1 | 11/2004 | Giesen et al. | |
| 6,828,988 B2 | 12/2004 | Hudson et al. | |
| 6,931,603 B2 | 8/2005 | Boegelund | |
| 7,240,323 B1 * | 7/2007 | Desai et al. | 717/100 |
| 7,353,246 B1 | 4/2008 | Rosen et al. | |
| 7,533,340 B2 | 5/2009 | Hudson et al. | |
| 8,046,735 B1 * | 10/2011 | Singh et al. | 717/105 |
| 8,522,196 B1 * | 8/2013 | Kim et al. | 717/105 |
| 2002/0054013 A1 | 5/2002 | Graham | |
| 2002/0118221 A1 * | 8/2002 | Hudson et al. | 345/711 |
| 2003/0004923 A1 * | 1/2003 | Real et al. | 707/1 |
| 2003/0164862 A1 * | 9/2003 | Cadiz et al. | 345/838 |
| 2004/0004632 A1 | 1/2004 | Knight et al. | |
| 2004/0021647 A1 * | 2/2004 | Iwema et al. | 345/179 |
| 2004/0036714 A1 | 2/2004 | Blakely et al. | |
| 2004/0205514 A1 * | 10/2004 | Sommerer et al. | 715/501.1 |
| 2004/0215649 A1 * | 10/2004 | Whalen et al. | 707/102 |
| 2004/0225959 A1 | 11/2004 | D'Orto et al. | |

(Continued)

OTHER PUBLICATIONS

Ahlstrom et al., Improving menu interaction: a comparison of standard, force enhanced and jumping menus, Apr. 2006, 10 pages.*

(Continued)

*Primary Examiner* — Thuy Dao
(74) *Attorney, Agent, or Firm* — Kevin Sullivan; Kate Drakos; Micky Minhas

(57) ABSTRACT

Various technologies and techniques improve the process for creating and displaying context menus and tooltips. Procedures for listening for events, enabling, retrieving and displaying context menus and tooltips reside in a central service model. The developer accesses the central service model and specifies content for a context menu or tooltip. Rich media content such as audio, video, and graphic output can be included in context menus and tooltips. Shapes and effects of displayed content can also be customized.

20 Claims, 12 Drawing Sheets

(56) References Cited

U.S. PATENT DOCUMENTS

| | | | |
|---|---|---|---|
| 2005/0028107 A1* | 2/2005 | Gomes et al. | 715/762 |
| 2005/0050470 A1 | 3/2005 | Hudson et al. | |
| 2005/0076372 A1 | 4/2005 | Moore et al. | |
| 2005/0086690 A1 | 4/2005 | Gilfix et al. | |
| 2005/0091578 A1* | 4/2005 | Madan et al. | 715/512 |
| 2005/0125744 A1 | 6/2005 | Hubbard et al. | |
| 2005/0197826 A1 | 9/2005 | Neeman | |
| 2005/0204309 A1 | 9/2005 | Szeto | |
| 2005/0283728 A1 | 12/2005 | Pfahlmann et al. | |
| 2006/0036996 A1* | 2/2006 | Low | 717/113 |
| 2006/0085741 A1 | 4/2006 | Weiner et al. | |
| 2007/0146812 A1 | 6/2007 | Lawton | |
| 2007/0240057 A1 | 10/2007 | Satterfield et al. | |
| 2007/0240101 A1* | 10/2007 | Wilson | 717/104 |
| 2009/0094105 A1 | 4/2009 | Gounares et al. | |
| 2009/0313597 A1* | 12/2009 | Rathbone et al. | 717/100 |

OTHER PUBLICATIONS

Findlater et al., A comparison of static, adaptive, and adaptable menus, Apr. 2004, 8 pages.*

Office Action received for U.S. Appl. No. 11/402,299, mailed on Jun. 20, 2008, 11 pages.

Office Action received for U.S. Appl. No. 11/402,299, mailed on Aug. 17, 2009, 9 pages.

Office Action received for U.S. Appl. No. 11/402,299, mailed on Nov. 13, 2009, 9 pages.

Office Action received for U.S. Appl. No. 11/402,299, mailed on Oct. 27, 2010, 11 pages.

Office Action received for U.S. Appl. No. 11/402,299, mailed on Apr. 4, 2011, 11 pages.

Rekimoto et al., "Pre-Sense: Interaction Techniques for Finger Sensing Input Devices", Proceedings of the 16th Annual ACM Symposium on User Interface Software & Technology (UIST'03), 2003, pp. 203-212.

Saha, "A Novel 3-Tier XML Schematic Approach for Web Page Translation", Ubiquity, Magazine, Nov. 2005, 14 pages.

"Thesaurus Tooltip Sample", accessed at: http://cmsdevelopment.com/thesuarus, Jul. 6, 2007, 3 pages.

Office Action received for U.S. Appl. No. 11/868,749, mailed on Sep. 22, 2010, 10 pages.

Office Action received for U.S. Appl. No. 11/402,299, mailed on Dec. 2, 2008, 10 pages.

Office Action received for U.S. Appl. No. 11/402,299, mailed on Jul. 16, 2010, 10 pages.

* cited by examiner

CENTRALIZED CONTEXT MENUS AND TOOLTIPS

BACKGROUND

Tooltips and context menus are used in numerous software applications. Tooltips are nuggets of information that help users familiarize themselves with features of a software application without needing to read a user manual or access web-based help. For instance, if a user hovers his or her mouse over a toolbar's button, it displays a tooltip as a brief textual description of that button's function. Context menus give users access to frequently-used menu commands that relate to the operation of the context in which the user works. Often, a context menu is associated with a control to target its menu more specifically to the user's needs. In this manner, context menus can save steps for the user by displaying menus without having to click on menu and submenu selections. Context menus can be displayed when the user presses a single key or combination of keys on a keyboard. For example, in MICROSOFT® Office Word, right-clicking, or holding down the Shift key while pressing F10 displays menu selections pertaining to ways that text can be formatted.

Current technologies such as MICROSOFT® VISUAL BASIC® allow developers to design part of the user interface for a software program simply by dragging and dropping controls, such as buttons and dialog boxes, onto a form. Then developers define each control's appearance and behavior. Developers cannot implement a tooltip or context menu for a control unless the control contains a property or pre-defined field to support a context menu or tooltip. For controls that do not have these built-in properties for tooltips and context menus, developers must manually write code for listening for events, creating a context menu or tooltip control when the specified event occurs, and displaying the content. This is time consuming.

Further limitations of current technologies permit context menus and tooltips to exist only for certain controls on status bars, menu bars, and user interfaces. Furthermore, displayed content is limited to text in a box. The sum of all these limitations requires developers to spend significant time coding context menus and tooltips.

SUMMARY

Various technologies and techniques are disclosed that improve the process for creating and displaying context menus and tooltips. These technologies and techniques employ a centralized model that allows controls and various parts of a software application to access it. Developers can create a context menu or tooltip for any control. The central service model handles procedures associated with context menus and tooltips. This includes, but is not limited to, listening for events, creating context menu or tooltip controls, and displaying content. Developers write code to access the central service model and specify the content of the tooltip or context menu. A tooltip or context menu can include audio output, graphics, video clips, or other rich media content. In one implementation, the shapes and effects of the tooltip or context menu can be customized. By way of example and not limitation, a tooltip can be an idea bubble with a graphic in it.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
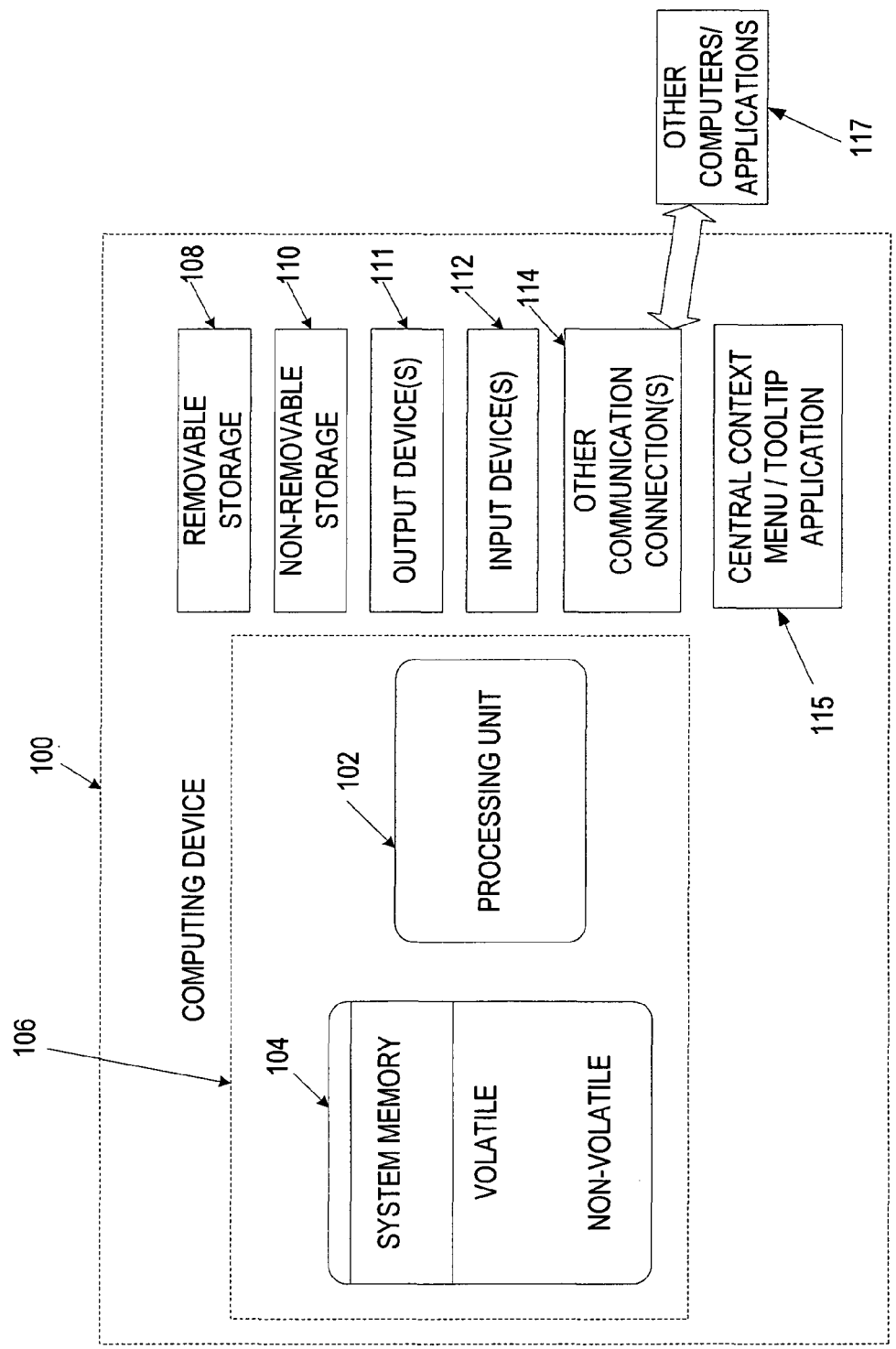
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that employs a central service model for generating context menus and/or tooltips. The system also serves other purposes in addition to these. One or more of the techniques described herein can be implemented as features within programs such as MICROSOFT® Office Word, MICROSOFT® Office Excel, online help programs, web browsers, custom software programs, or from any other type of program or service that uses context menus and tooltips. As described in further detail herein, in one implementation of the system, properties of context menus and tooltips are created and maintained in a central service model, where they can be reused from many software applications. In another implementation, developers write code to access the central service model to specify content for context menus and tooltips. In yet another implementation, content may be enhanced by use of rich media and customized display options.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with one or more computers and/or applications 117. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

Figure 2:
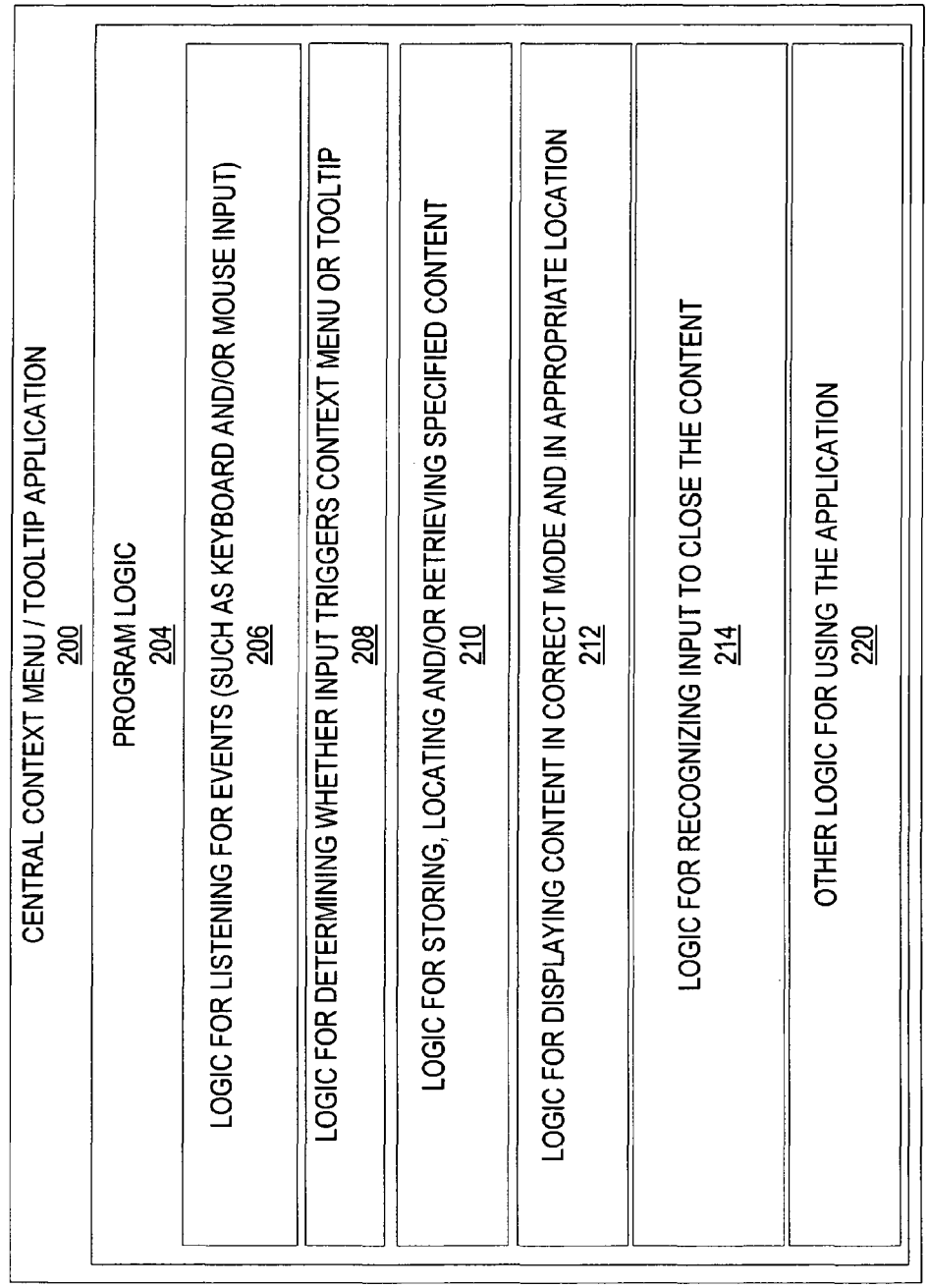
FIG. 2 is a diagrammatic view of a central context menu/tooltip application operating on the computer system of FIG. 1 in one implementation.

Turning now to FIG. 2 with continued reference to FIG. 1, a central context menu/tooltip application 200 operating on computing device 100 is illustrated. Context menu/tooltip application 200 is one of the application programs that reside on computing device 100. In one implementation, context menu/tooltip application 200 is included as part of the operating system of computing device 100, such as one running MICROSOFT® WINDOWS® or LINUX In another implementation, context menu/tooltip application is not part of the operating system but is a separate program. Alternatively or additionally, one or more parts of context menu/tooltip application 200 can be part of system memory 104, on other computers and/or applications 117, or other such variations as would occur to one in the computer software art.

Context menu/tooltip application 200 includes program logic 204, which is responsible for carrying out some or all of the techniques described herein. Program logic 204 includes logic for a listening for events 206; logic for determining whether the event should trigger a context menu or tooltip 208; logic for storing, locating, and/or retrieving information from a central service model 210; logic for displaying content in a correct mode and location 212; and logic for closing the context menu or tooltip 214. In one implementation, program logic 204 is operable to be called programmatically from another program, such as using a single call to a procedure in program logic 204.

In one implementation, program logic 204 resides on computing device 100. However, it will be understood that program logic 204 can alternatively or additionally be embodied as computer-executable instructions on one or more computers and/or in different variations. As one non-limiting example, one or more parts of program logic 204 could alternatively or additionally be implemented on one or more other computers and/or applications 117.

Figure 3:
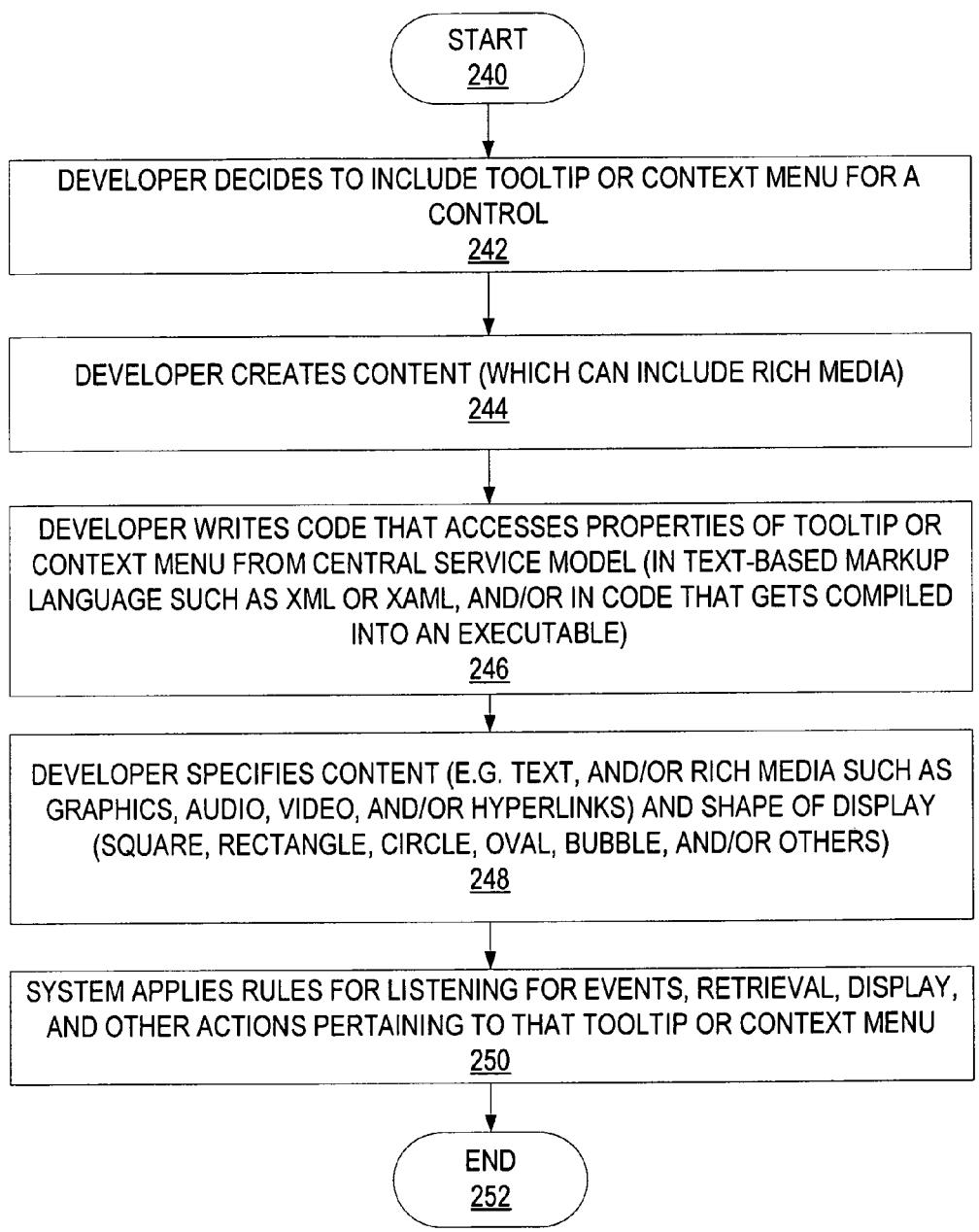
FIG. 3 is a high-level process flow diagram for one implementation of the system of FIG. 1.
Figure 4:
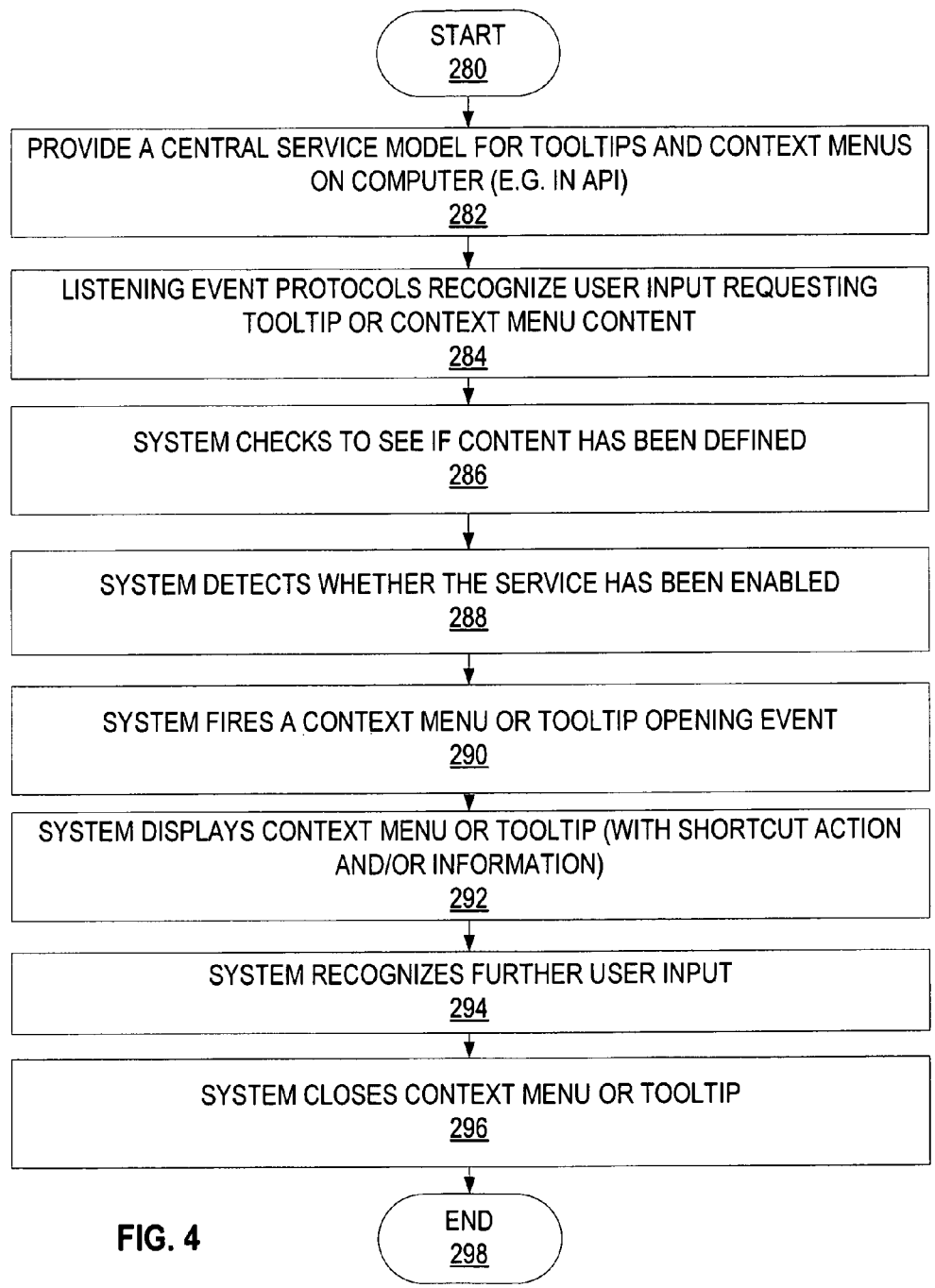
FIG. 4 is a process flow diagram for one implementation of the system of FIG. 1 illustrating the stages involved in implementing the central context menu/tooltip application.

Turning now to FIGS. 3-4 with continued reference to FIGS. 1-2, the stages for implementing one or more implementations of central context menu/tooltip application 200 are described in further detail. FIG. 3 is a high level process flow diagram for context menu/tooltip application 200 that illustrates the stages involved in creating a context menu or tooltip using the central service model. In one form, the process of FIG. 3 is at least partially implemented in the operating logic of computing device 100.

The procedure begins at start point 240 with a developer choosing to create a context menu or tooltip for a specified control (stage 242). In one implementation, the developer creates content for the control (stage 244), which can include rich media content, as described herein. The developer accesses properties of the central service model (stage 246) for a context menu or tooltip. The developer specifies the content for the context menu or tooltip (stage 248), which can include, but is not limited to, on-screen text and/or graphics, audio output, video output, and/or hyperlinks. The shape in which the content should be displayed can also be specified (stage 248), including, but not limited to a square, rectangle, circle, oval, bubble, and/or other shapes. In one implementation, the developer writes code for the tooltip or context menu using a development system such as MICROSOFT® VISUAL BASIC® or MICROSOFT® C#®. In another implementation, the developer writes code for the tooltip or context menu using a text-based markup language, such as extensible markup language (XML) or extensible application markup language (XAML). The process ends at end point 252.

FIG. 4 illustrates a process flow diagram for one implementation of central context menu/tooltip application 200. In one form, the process of FIG. 4 is at least partially implemented in the operating logic of computing device 100. The procedure begins at start point 280 with providing a central service model on computing device 100 (stage 282). Listening event protocols detect user input that signal a context menu or tooltip should be displayed (stage 284). Context menu/tooltip application 200 checks to see that content has been defined for the context menu or tooltip that is being called up (stage 286). If content is present and the service is enabled (stage 288), an event is fired (stage 290) to open the appropriate context menu or tooltip, which is displayed in the correct mode and in the correct location (stage 292) on computer output device 111. Further user input (stage 294) triggers a subsequent event to close the context menu or tooltip (stage 296). The process ends at end point 298.

Figure 5:
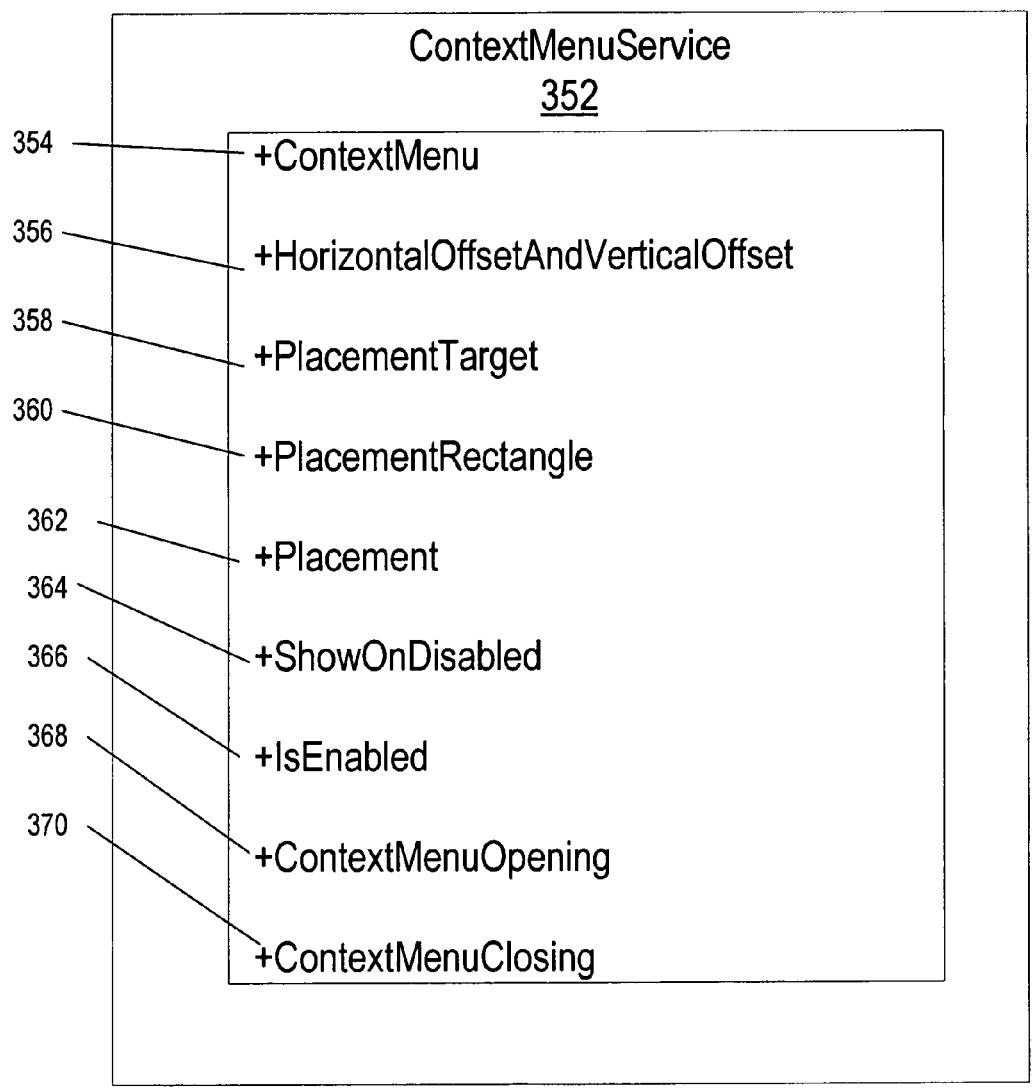
FIG. 5 is an object diagram of the context menu service of one implementation of the system of FIG. 1.
Figure 6:
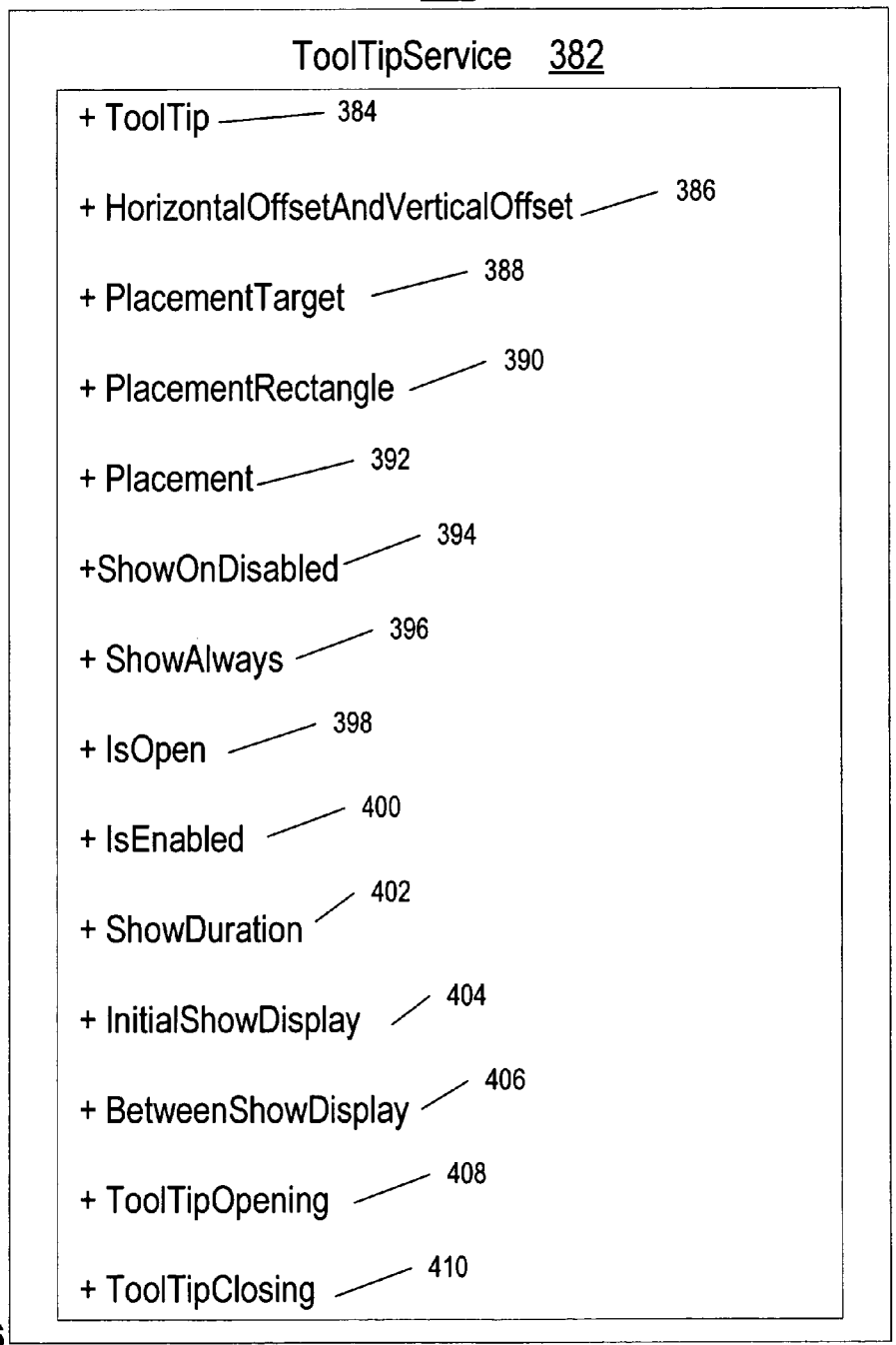
FIG. 6 is an object diagram of the tooltip service of one implementation of the system of FIG. 1.

Turning now to FIGS. 5-6 with continued reference to FIGS. 2-4, FIG. 5 illustrates an exemplary API 350 for ContextMenuService 352 with its accompanying procedures. More or fewer properties and/or methods can be included in ContextMenuService 352. Exemplary API 350 includes the following:

ContextMenu 354 specifies an instance of a context menu to display.

HorizontalOffsetAndVerticalOffset 356 specifies horizontal and vertical offsets from the default position of the context menu.

PlacementTarget 358 specifies an alternate element on which to position the context menu.

PlacementRectangle 360 specifies a rectangle relative to the Placement Target 358 or to the control on which the context menu is specified to use in positioning the context menu.

Placement 362 specifies the positioning algorithm to use when positioning the context menu.

ShowOnDisabled 364 specifies whether to show the context menu even if the element on which it is specified is disabled.

IsEnabled 366 specifies whether the context menu service is enabled or disabled on the element.

ContextMenuOpening 368 specifies an event that fires just before a context menu should be opened.

ContextMenuClosing 370 specifies an event that fires just as a context menu closes.

FIG. 6 illustrates an exemplary API 380 for ToolTipService 382 with its accompanying procedures. More or fewer properties and/or methods can be included in ToolTipService 382. Exemplary API 380 includes the following:

ToolTip 384 specifies either an instance of a tooltip or the content of a tooltip to display.

HorizontalOffsetAndVerticalOffset 386 specifies horizontal and vertical offsets from the default position of the tooltip.

PlacementTarget 388 specifies an alternate element on which to position the tooltip.

PlacementRectangle390 specifies a rectangle relative to the Placement Target 388 or to the control on which the tooltip is specified to use in positioning the tooltip.

Placement392 specifies the positioning algorithm to use when positioning the tooltip.

ShowOnDisabled 394 specifies whether to show the tooltip even if the element on which it is specified is disabled.

ShowAlways 396 specifies whether to show the tooltip even when the main window is not active.

IsOpen 398 is a read-only property specifying whether the tooltip is currently open.

IsEnabled 400 specifies whether the tooltip service is enabled or disabled on the element.

ShowDuration 402 specifies how long the tooltip will remain open.

InitialShowDelay 404 specifies how long to wait before showing a tooltip.

BetweenShowDelay 406 specifies how much time must pass from when the last tooltip closed and a new one could be opened before we use Initial Show Delay.

ToolTipOpening 408 specifies an event that fires just before a tooltip should be opened.

ToolTipClosing 410 specifies an event that fires just as a tooltip closes.

Figure 7:
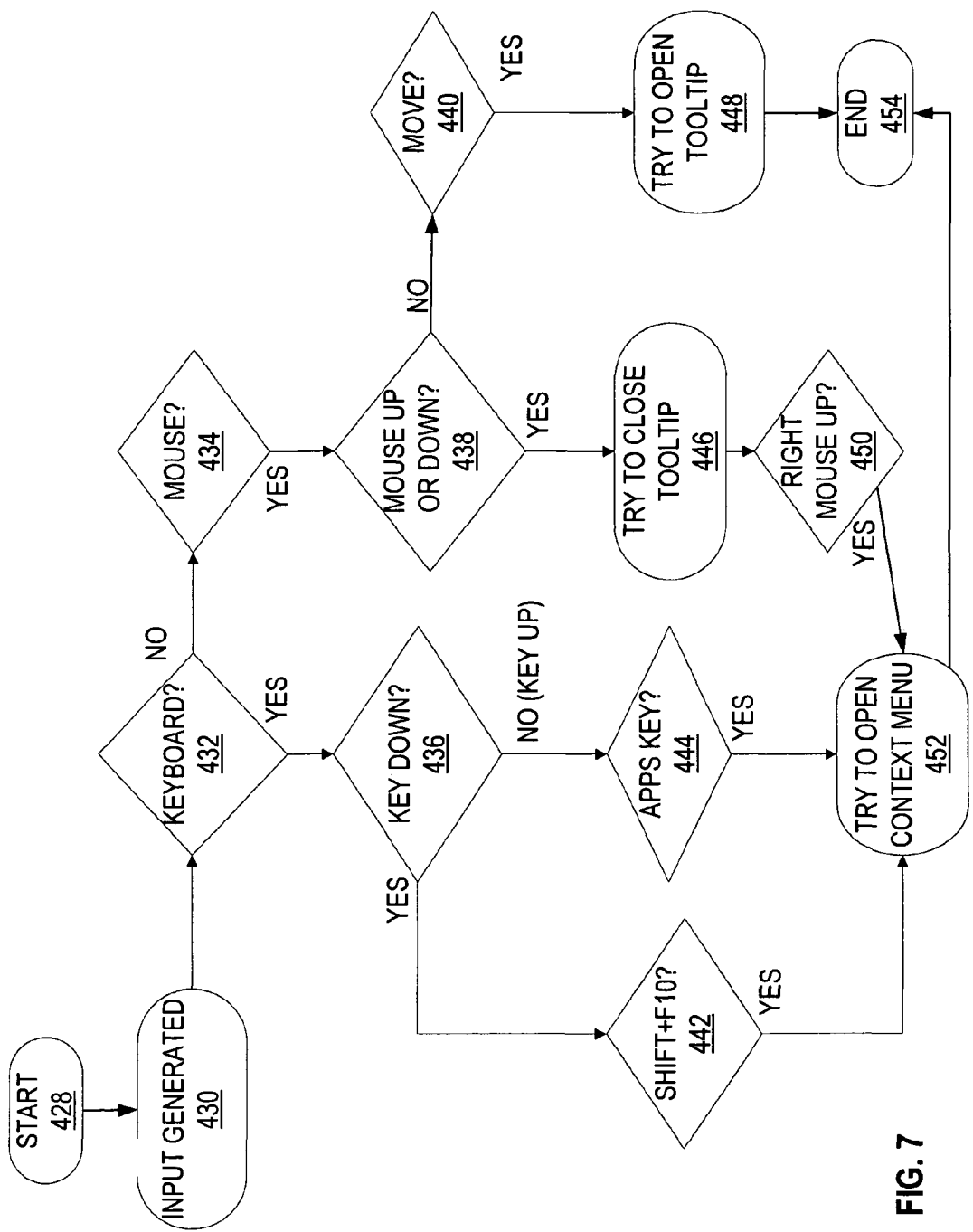
FIG. 7 is a process flow diagram for one implementation of the system of FIG. 1 illustrating the stages involved in the decision process for opening a context menu or tooltip.

FIG. 7 illustrates the stages involved in listening for events that trigger the need to display a context menu or tooltip. In one form, the process of FIG. 7 is at least partially implemented in the operating logic of computing device 100. The process starts at start point 428 when the user generates input, such as keyboard input (stage 432) or mouse input (stage 434), from input device(s) 112 that signals the system to either open or close a context menu or tooltip. In one implementation, when the user presses and/or releases the Key Down key (stage 436), Shift+F10 keys concurrently (stage 442), the Apps Key (stage 444), and/or another applicable input, the system tries to open a context menu (stage 452). In one implementation, if a mouse or other input device move is detected (stage 440), then the system tries to open a tooltip (stage 448). If a mouse or other input device up or down is detected (stage 438), then the system tries to close a tooltip (stage 446). In one implementation, if the event was a "right" mouse up (or other "right" input device up) event (stage 450), then the system tries to open a context menu (stage 452). Numerous other mouse, keyboard, and/or other input device variations instead of or in addition to these could also be used to open and/or close tooltips and/or context menus. For example, keyboard, mouse, stylus, and/or other input devices could be used with some, all, and/or additional system and/or custom-defined input combinations for opening and closing tooltips and/or context menus. The process then ends at end point 454.

Figure 8:
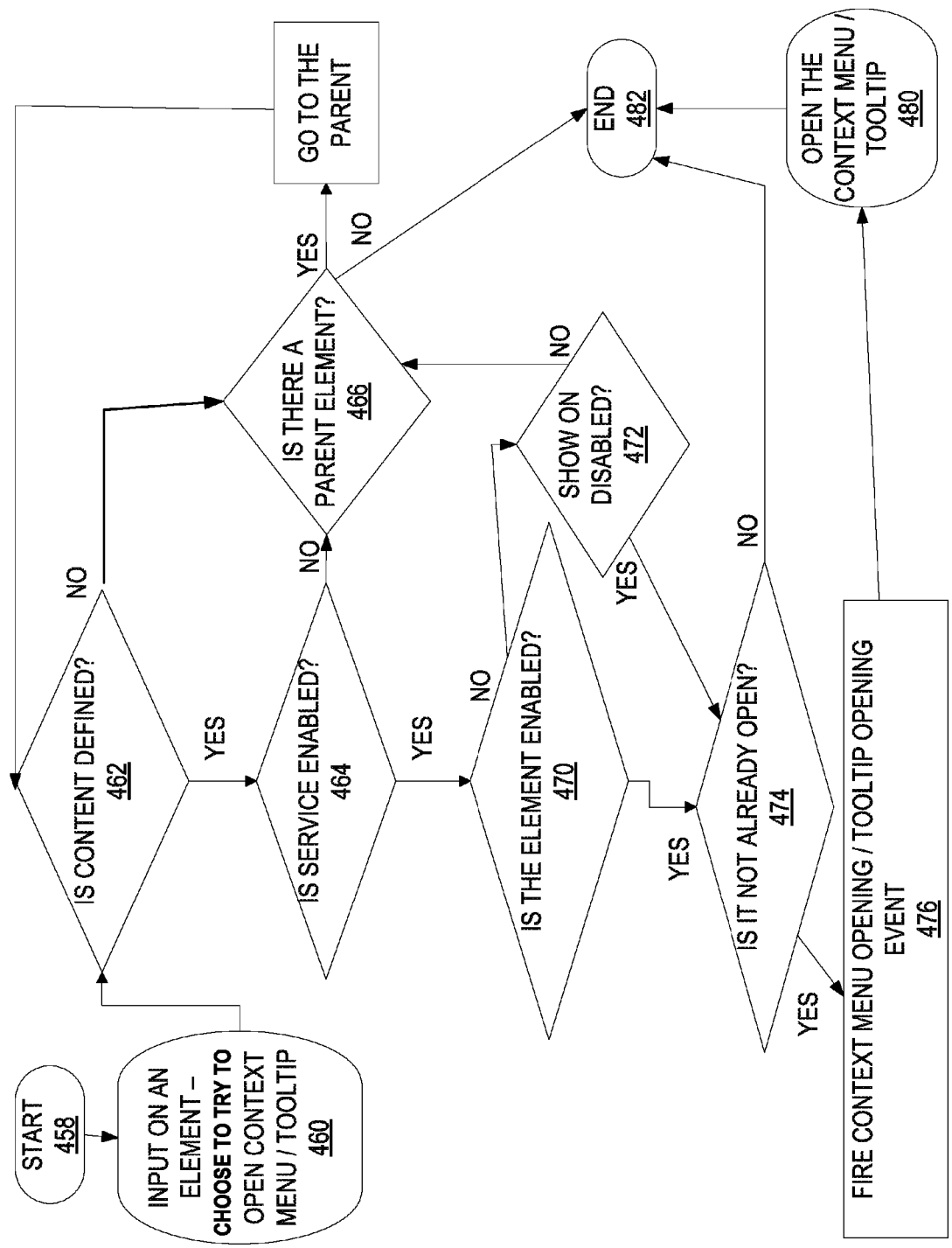
FIG. 8 is a process flow diagram for one implementation of the system of FIG. 1 illustrating the process of finding a context menu or tooltip to open after deciding to attempt to open one.

FIG. 8 is a process flow diagram for one implementation that illustrates the stages involved in finding a context menu or tooltip to open after deciding to attempt to open one. In one form, the process of FIG. 8 is at least partially implemented in the operating logic of computing device 100. The procedure begins at start point 458 with an input device (e.g. mouse or keyboard) event firing that attempts to open a context menu or tooltip (stage 460). If content is defined (decision point 462) for the context menu or tooltip on the element receiving input, then the system checks to see if the context menu or tooltip service is enabled for that element (decision point 464), makes sure the context menu or tooltip is not already open (decision point 474), and if it is not already open, fires the opening event for the context menu or tooltip (stage 476). The opening event then executes and opens the context menu or tooltip (stage 482).

In several circumstances, the system checks to see if there is a parent element (decision point 466). For example, if no content is defined (decision point 462), if the service is disabled (decision point 464), or if the element is disabled and should not be shown on disabled (decision point 472), then the parent element is checked (decision point 466). If there is a parent element, then the system goes to the parent element (stage 468) to see if content is defined for it (decision point 462). If so, then the other stages are performed for the parent element to see if the service is enabled for it (decision point 464), if the element is enabled (decision point 470), and to make sure the parent element is not already open (decision point 474) before firing the opening event (stage 476) to open it (stage 480). The process then ends at end point 482.

Figure 9:
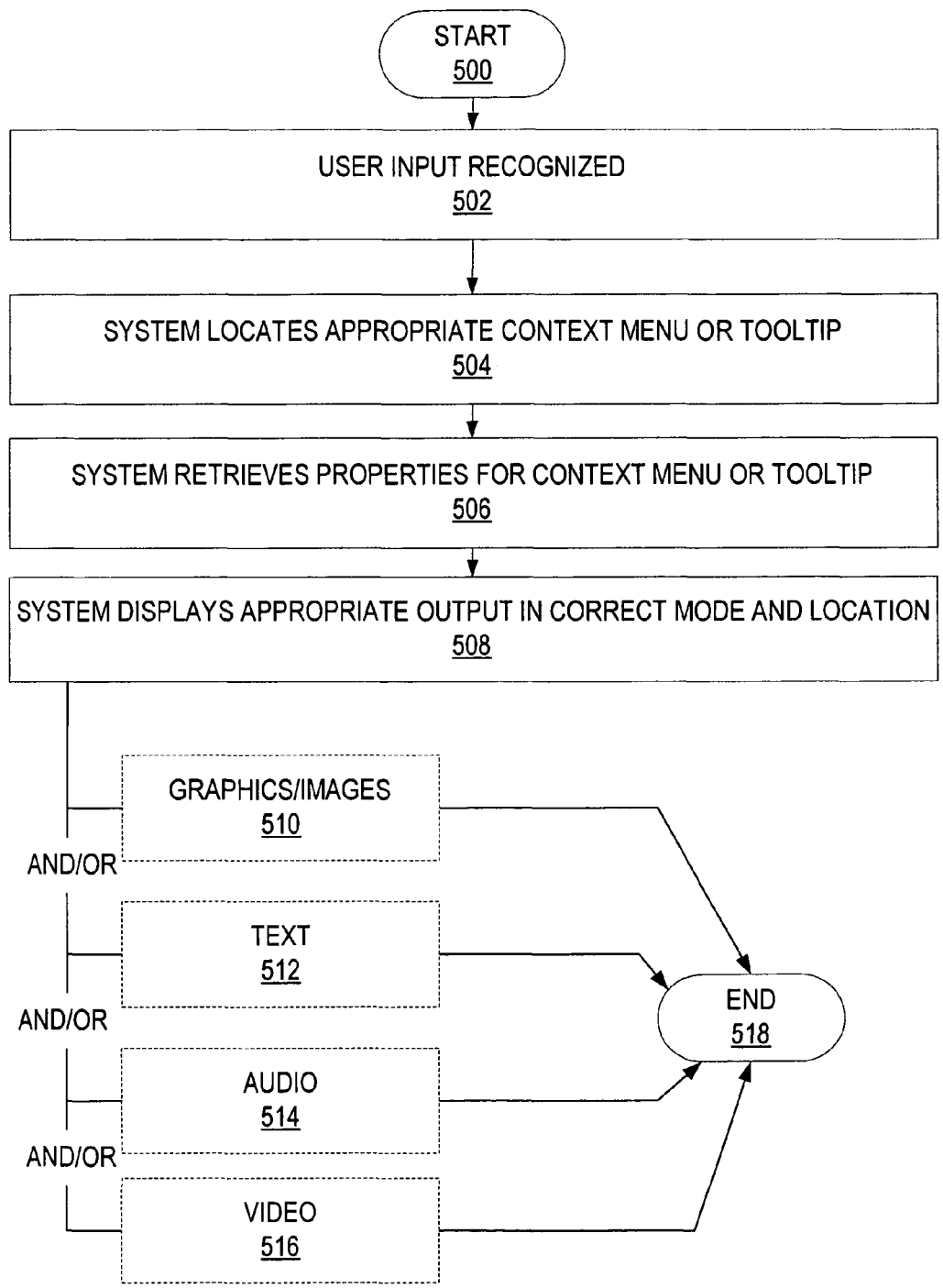
FIG. 9 is a process flow diagram for one implementation of the system of FIG. 1 that illustrates how the system displays rich content.

FIG. 9 is a flow diagram that illustrates some exemplary options for the one or more types of content or combinations of content that can be included in a context menu or tooltip. In one form, the process of FIG. 9 is at least partially implemented in the operating logic of computing device 100. The procedure begins at start point 500, with recognizing user input (stage 502). The system locates the context menu or tooltip (stage 504) that has been signaled by user input. The system retrieves the settings for the context menu or tooltip (stage 506). The system displays the output in the correct mode and in the correct location onscreen (stage 508). For example, the system displays graphics/images (stage 510), text (stage 512), audio (stage 514) and/or video (stage 516) for the context menu or tooltip. Numerous other types of content could also be used in other implementations. The process then ends at end point 518.

Figure 10:
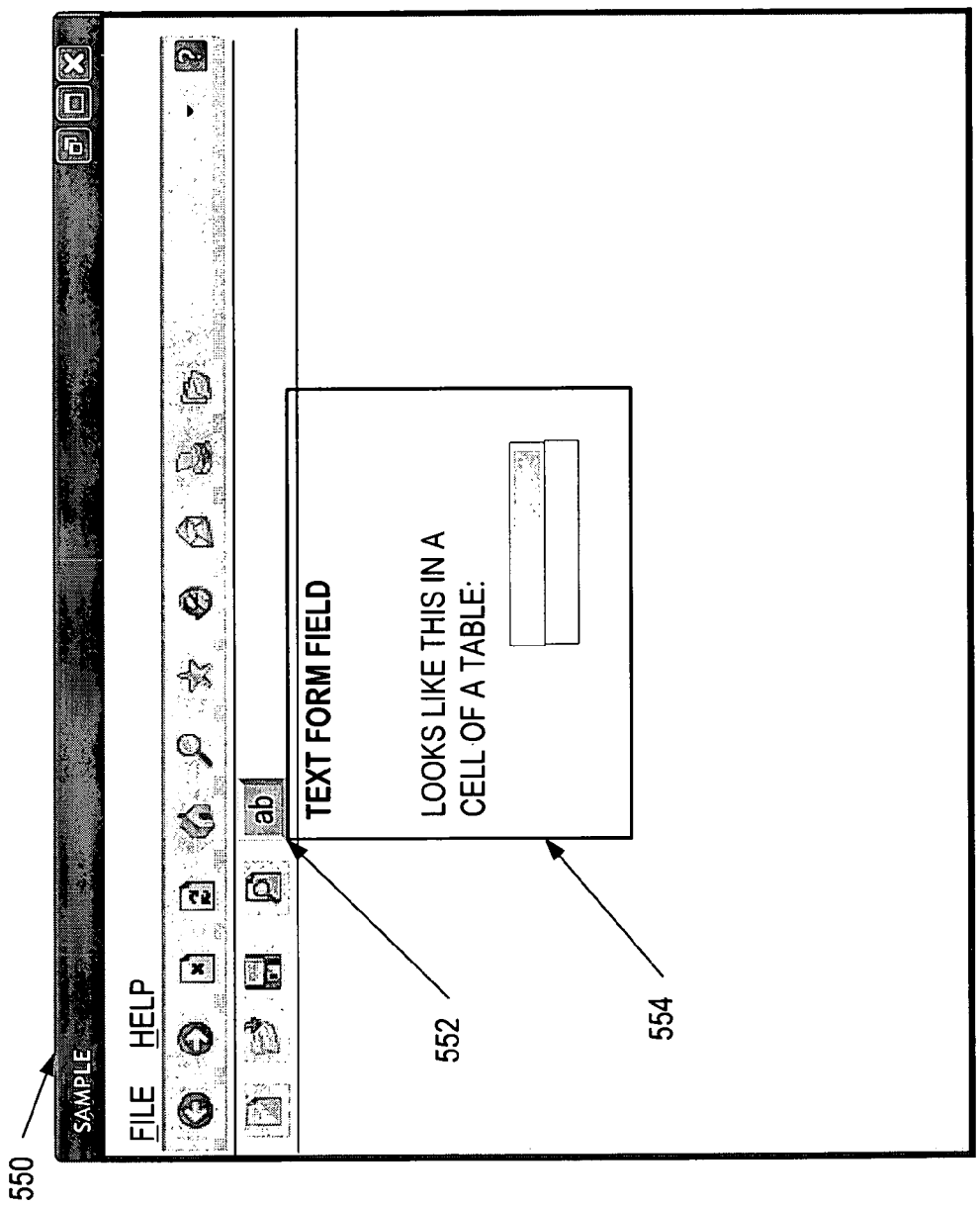
FIG. 10 is a simulated screen for one implementation of the system of FIG. 1 that illustrates a graphics-based tooltip.
Figure 11:
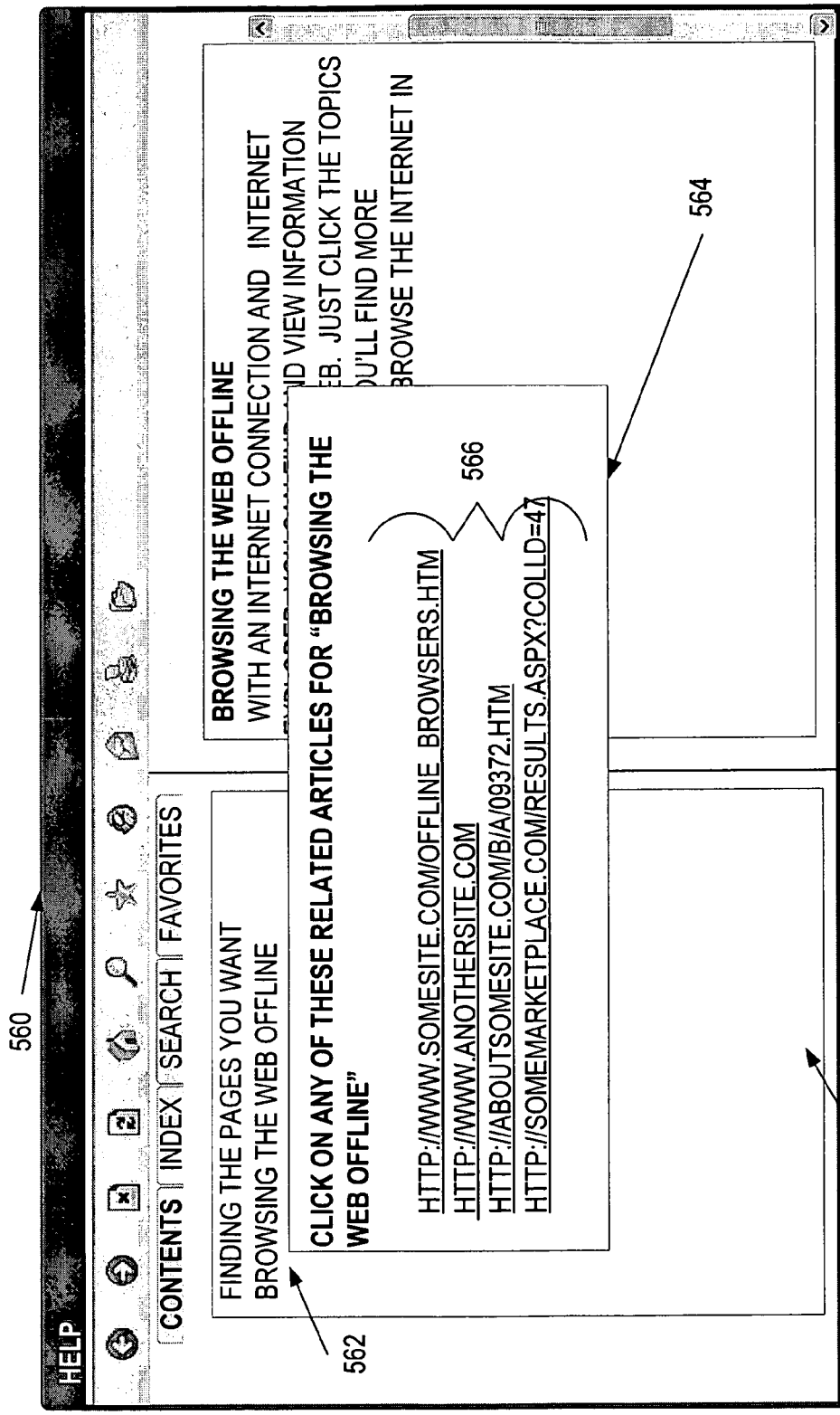
FIG. 11 is a simulated screen for one implementation of the system of FIG. 1 that illustrates a context menu containing hyperlinks.
Figure 12:
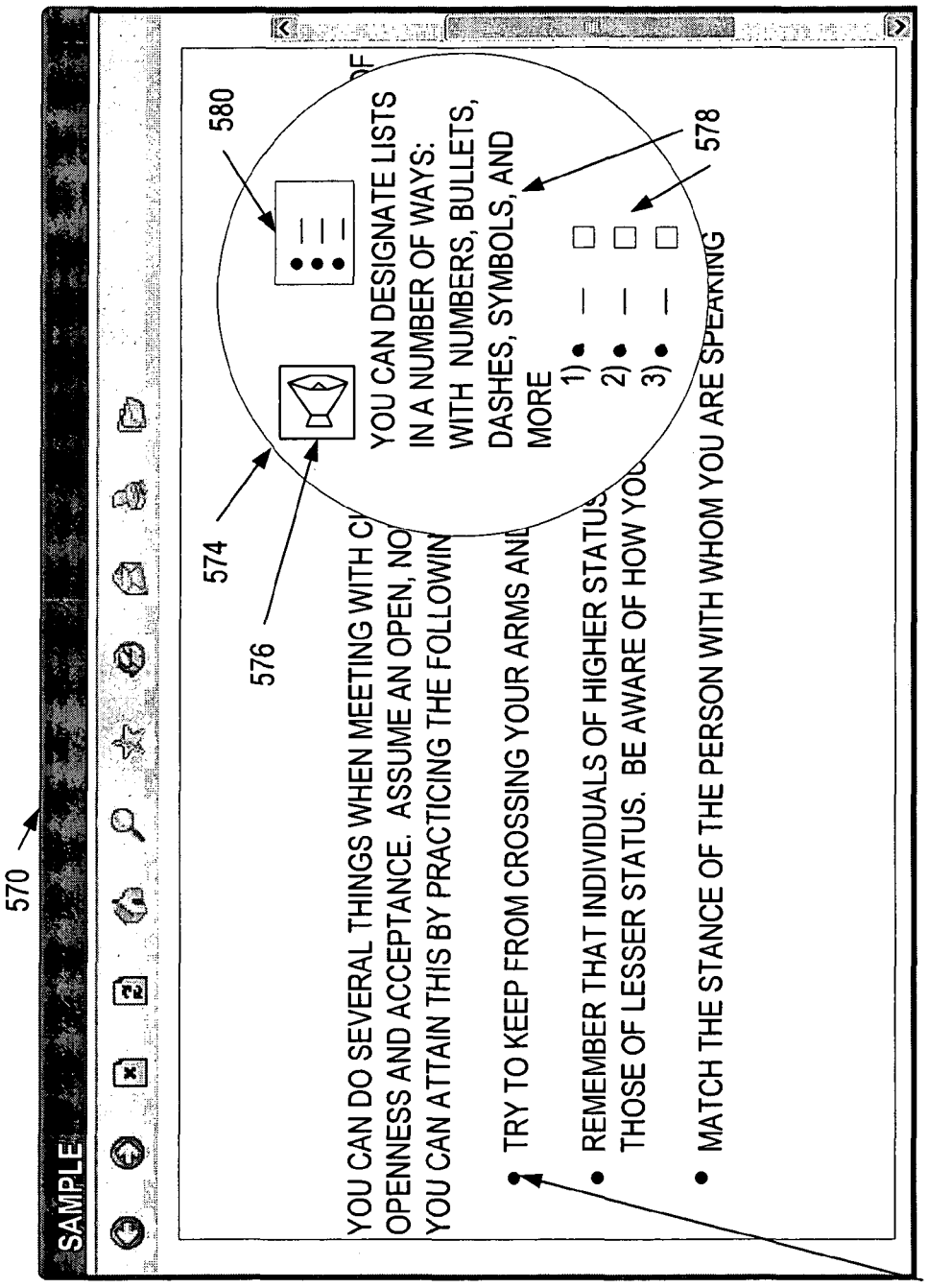
FIG. 12 is a simulated screen for one implementation of the system of FIG. 1 that illustrates a context menu with audio and text output.

Turning now to FIGS. 10-12, simulated screens are shown to illustrate exemplary user interfaces that use context menu/tooltip application 200. These screens can be displayed to users on output device(s) 111. Furthermore, these screens can receive input from users from input device(s) 112. These simulated screens are non-limiting examples of the variety of options that are available using one or more of the technologies and techniques discussed herein.

FIG. 10 shows a simulated screen 550 with a graphic option of a simulated tooltip 554 that appears when the system detects a user hovering his or her input device over button 552 on the toolbar in an application. In the example illustrated, this graphic addition to the tooltip helps describe how the table feature will appear when used.

FIG. 11 shows a simulated screen 560 of one implementation with a context menu 564 that appears when the system detects a hot-key combination or mouse right-click on text 562 (here, the words "Browsing the Web Offline"). The system determines that this requires opening of context menu 564, which is retrieved and displayed onscreen. The context menu lists hyperlinks 566 to articles related to the control identified in the text as "Browsing the Web Offline." The user can click on any hyperlink 566 within context menu 564, which will open a window containing that article.

FIG. 12 shows a simulated screen 570 of one implementation with both audio 576 and visual text 578 that appears in a context menu 574 when the system detects a hot-key combination or mouse right-click on bulleted list 572 (here, a bulleted list). The system determines that this requires opening of context menu 574, which is retrieved and displayed onscreen. Context menu 574 in one implementation automatically plays audio output 576 while simultaneously displaying text 578 that explains options available for formatting bulleted lists. In another implementation, the audio output 576 is not played until selected by the user. The formatting icon 580 provides a shortcut to selecting these features and options. In this example, the content menu also includes extra information in addition to just the action that can be taken by the user. Furthermore, it should be noted that context menu 574 is contained in a circle or idea bubble. This is one non-limiting example of many shape and effect options that can be used for displaying context menus and/or tooltips.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described herein in the examples discussed herein could be organized differently on one or more computers to include fewer or additional options or features than as portrayed in the examples.

What is claimed is:

1. A method, executed by a processing unit, for providing content for information messages comprising the steps of:
    providing a central service that is operable to process tooltips and context menus for a plurality of applications, the central service maintaining properties of context menus and tooltips that are reusable from a plurality of software applications to generate context menus and tooltips;
    listening at the central service to a series of inputs and detecting whether a first event is fired, the first event being fired from code included in a particular application that is not part of the central service, the code being configured to access the central service, the central service being operable to fire a second event if the central service determines that content has been defined for a particular option in the particular application that is not part of the central service and determines that the central service is enabled for the particular option;
    detecting that the second event is fired, if the central service determines that the content for the particular option is a tooltip content, then retrieving the tooltip content and displaying it on a user interface as an information message to a user; and
    detecting that the second event is fired, if the central service determines that the content for the particular option is a context menu content, then retrieving the content menu content and displaying it on the user interface as at least one action that can be selected by the user based on a context of the particular option.

2. The method of claim 1, wherein the content is displayed on the user interface in a content area having a shape selected from the group consisting of a rectangle, square, circle, oval, bubble, and other shapes.

3. The method of claim 1, wherein the series of inputs include at least one of a mouse move action, a right mouse up action, or a combination of a shift key and an F10 key.

4. The method of claim 1, further comprising:
    enabling a developer to create a context menu or a tooltip using the central service that maintains properties of context menus and tooltips that are reusable from a plurality of software applications to generate context menus and tooltips.

5. The method of claim 1, wherein at least a portion of the content for the element is in an external file.

6. The method of claim 1, wherein the content includes rich media content.

7. A method, executed by a processing unit, for providing rich media content for information messages comprising the steps of:
    providing a central service that is operable to process tooltips and context menus for a plurality of applications, the central service maintaining properties of context menus and tooltips that are reusable from a plurality of software applications to generate context menus and tooltips;
    listening at the central service to a series of inputs and detecting that an event is fired to retrieve content that has been defined for a particular option in a particular application that is not part of the central service, the event being fired from code included in the particular application that is configured to access the central service, the content being configured to be displayed in a tooltip or a context menu;
    determining that the central service is enabled for the particular option;
    retrieving the content that has been defined for the particular option, the content including rich media;
    displaying the content on a user interface; and
    enabling a developer to create the context menu or the tooltip using the central service that maintains properties of context menus and tooltips that are reusable from a plurality of software applications to generate context menus and tooltips, said enabling including
        enabling the developer to define content for the context menu or the tooltip, and
        enabling the developer to access properties of the central service for the context menu or the tooltip.

8. A computing device having program logic embodied as computer-executable instructions stored in a memory of the computing device, the program logic comprising:
    first program logic configured as a central service that is operable to process tooltips and context menus for a plurality of applications, the central service maintaining properties of context menus and tooltips that are reusable from a plurality of software applications to generate context menus and tooltips;

the first program logic including:
- second program logic configured to listen to a series of inputs to detect whether a first event is fired, the first event being fired from code included in a particular application that is not part of the central service, the code being configured to access the central service, the central service being operable to fire a second event if the central service determines that content has been defined for a particular option in the particular application that is not part of the central service and determines that the central service is enabled for that particular option;
- third program logic configured to detect that the second event is fired, if the central service determines that the content for the particular option is a tooltip content, then the central service retrieves the tooltip content and displays it on a user interface as an information message to a user; and;
- fourth program logic configured to detect that the second event is fired, if the central service determines that the content for the particular option is a context menu content, then the central service retrieves the context menu content and displays it on the user interface as at least one action that can be selected by the user based on a context of the particular option.

9. The computing device of claim 8, wherein the tooltip includes additional information to describe the particular option of the particular application.

10. The computing device of claim 8, wherein the central service accesses code written by a developer to determine if content has been defined for the particular option.

11. The computing device of claim 10, wherein the code written by the developer is in a text file.

12. The computing device of claim 11, wherein the code in the text file is written in a text-based markup language.

13. The computing device of claim 8, wherein at least a portion of the content for the particular option is in an external file.

14. The computing device of claim 8, wherein at least one of the series of inputs is a mouse move action.

15. The computing device of claim 8, wherein at least one of the series of inputs is a right mouse up action.

16. The computing device of claim 8, wherein at least one of the series of inputs is a combination of a shift key and an F10 key.

17. The computing device of claim 8, wherein the content includes rich media content.

18. A computer-readable memory device having computer-executable instructions in the form of program logic, the program logic comprising:
- first program logic configured as a central service that is operable to process tooltips and context menus for a plurality of applications, the central service maintaining properties of context menus and tooltips that are reusable from a plurality of software applications to generate context menus and tooltips;
- the first program logic including:
  - second program logic configured to listen to a series of inputs to detect whether a first event is fired, the first event being fired from code included in a particular application that is not part of the central service, the code being configured to access the central service, the central service being operable to fire a second event if the central service determines that content has been defined for a particular option in the particular application that is not part of the central service and determines that the central service is enabled for the particular option;
  - third program logic configured to detect that the second event is fired, if the central service determines that the content for the particular option is a tooltip content, then the central service retrieves the tooltip content and displays it on a user interface as an information message to a user; and
  - fourth program logic configured to detect that the second event is fired, if the central service determines that the content for the particular option is a context menu content, then the central service retrieves the context menu content and displays it on the user interface as at least one action that can be selected by the user based on a context of the particular option.

19. The computer-readable memory device of claim 18, wherein the content includes rich media content.

20. The computer-readable memory device of claim 18, wherein the series of inputs include at least one of a mouse move action, a right mouse up action, or a combination of a shift key and an F10 key.

\* \* \* \* \*